Nov. 1, 1966   E. SPIESSL   3,282,188
PHOTOGRAPHIC SHUTTER
Filed July 16, 1963
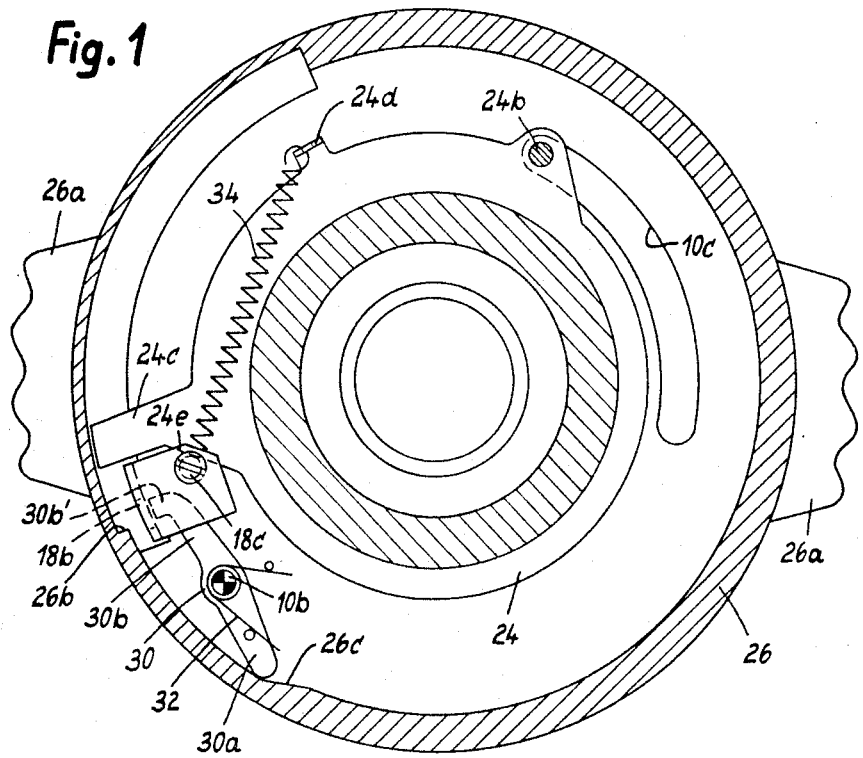
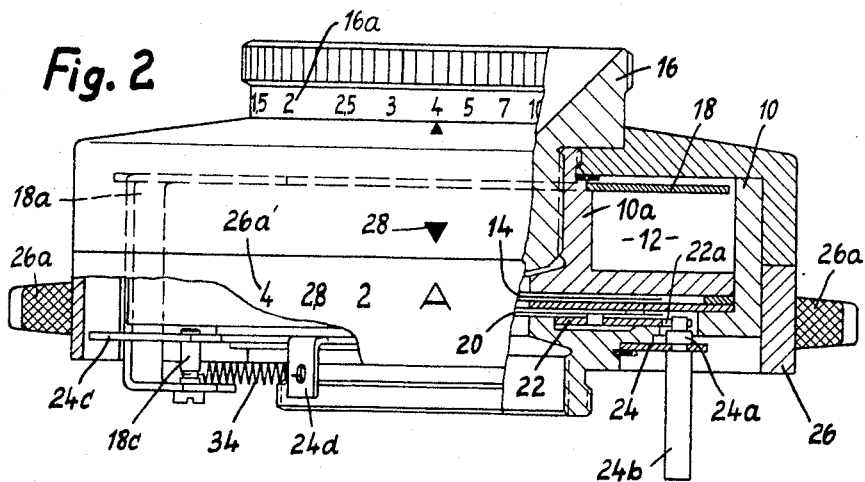

3,282,188
PHOTOGRAPHIC SHUTTER
Ewald Spiessl, Deisenhofen, near Munich, Germany, assignor to Compur-Werk Gesellschaft mit beschrankter Haftung & Co., Munich, Germany, a firm of Germany
Filed July 16, 1963, Ser. No. 295,442
Claims priority, application Germany, July 26, 1962, C 27,561
2 Claims. (Cl. 95—64)

The present invention relates to a photographic shutter having two setting rings, such as a time setting ring and a diaphragm setting ring with means for retaining the rings in engagement for setting movement in unison.

Heretofore cameras have been provided with setting rings which are coupled and controlled by an automatic regulating mechanism and exposure meter. However, such coupling means has generally taken the form of radially extending arms on the setting rings which arms are held in lateral engagement by coupling springs. These coupling springs, which are disposed at an inclined angle to the optical axis of the camera and causes "spreading" of the coupling arms which are engaged together which in turn creates lateral pressure between the setting rings and the guide means supporting the setting rings. Such lateral pressure increases the friction when the rings are rotated and impairs the operation of the camera.

In accordance with the present invention the setting rings are coupled so that there is no reactive effect from the coupling spring so that the rings can be moved while coupled with a minimum of effort. This objective is achieved by disposing the engaging surfaces between the setting rings perpendicular with respect to the direction of force of the coupling spring. Thus the coupling spring does not cause any relative movement between the two setting rings or cause any lateral pressure against the guide means so that the coupled rings may be rotated without any substantial frictional forces created by the coupling spring.

In accordance with one embodiment of the present invention one end of the coupling spring is secured to one of the setting rings and the other end of the coupling spring is secured to an anchoring pin mounted on the other setting pin. The anchoring pin extends parallel to the optical axis and is in engagement with a lateral contact surface on the first setting ring, this lateral contact surface being disposed at right angles to the direction of the force applied by the coupling spring. In cameras in which the time setting ring is disposed forwardly of the diaphragm setting ring, the time setting ring may be provided with a rearwardly projecting carrier arm for the anchoring pin while the diaphragm setting ring has a lateral coupling arm providing the contact surface.

An object of the present invention is to provide a photographic shutter having a pair of setting rings with a coupling means which does not create any undesirable friction between the setting rings and the guide means therefor.

Another object of the present invention is to provide a pair of setting rings with interengaging means and a spring coupling the rings wherein the direction of force of the spring extends perpendicular with respect to the engaging face on the interengaging means of the setting rings.

Other objects and many of the attendant advantages of the present invention will become more readily apparent upon consideration of the following detailed specification in connection with the accompanying drawings wherein:

FIGURE 1 is a plan view in section of a shutter in accordance with this invention, with parts nonessential to an understanding of the invention, of the present invention being omitted, and FIGURE 2 is a side view of the shutter according to the present invention with parts shown in section.

The shutter illustrated in FIGURES 1 and 2 includes a shutter housing 10 with a mechanism of a type known per se for operating the blades 14 of the shutter. Said mechanism is installed in the annular space 12 in this housing. The holder 16 for a front lens is adjustably guided in the front tube 10a of the shutter housing 10, and has a distance scale 16a marked on the periphery thereof. In addition a rotatable time cam ring 18 is rotatable on the tube 10a, and this has a rearwardly projecting carrier arm 18a and a latching opening 18b, (FIG. 1). An anchor pin 18c is secured to the carrier arm 18a.

A diaphragm is also provided in the shutter housing 10, with its leaves 20 arranged in an annular space behind the shutter blades 14. The control ring 22, for the diaphragm leaves 20, is coupled for rotary movement to a further diaphragm ring 24 by a pin and slot connection 22a, 24a. The diaphragm ring 24 has a lateral arm 24c, a cranked lug 24d and a pin 24b which projects rearwardly into the camera. This pin 24b is moved by a detector or follow-up device (not shown) which in turn cooperates with an electrical exposure meter in known manner.

A manually operable change over member 26 is rotatably mounted at the periphery of the shutter housing 10 and is provided with two grips 26a, an index A and diaphragm scale 26a', these being adjustable relatively to a fixed marker 28. Moreover, the member 26 (FIG. 1) has a setting nose 26b and a control cam 26c (FIG. 1). A double armed latching lever 30 is mounted on a fixed pin 10b A spring 32 biasses the latching lever 30 in the clockwise direction, and its arm 30a against the inner surface of the member 26. The other arm 30b of this latching lever has a nose 30b' which cooperates, in a manner to be described hereinafter, with the latching opening 18b of the carrier arm 18a. A coupling spring 34 secured to the lug 24d of the diaphragm ring 24 and to the anchor pin 18c of ring 18, urges the two rings into mutual engagement.

When the user actuates the camera trip, with the parts in the A-setting, the pin 24b is moved from its starting or limit position in the slot 10c, by the detector device and carries the two rings 24 and 18, in coupled condition, through the same angular travel into a new setting, corresponding, for example, to an exposure period of 1/125 sec. and a diaphragm aperture of 5.6. When the trip is liberated, the pin 24b is moved into its starting or limit position by means of a restoring spring (not shown). The two rings 24 and 18 positively follow this movement until re-assuming their starting or limit position—as indicated in FIGURE 1. In this starting or limit position the diaphragm is of maximum aperture, for example 2, and the time cam ring may have a setting of 1/30 second, for example.

If, on the other hand, a flashlight exposure must be taken, the user has to change the setting arrangement from the programming system (automatic or A-setting) to a manual setting. This is effected by the change over member 26 which, for this purpose, is rotated from the setting A in the clockwise direction until a diaphragm value is reached which corresponds to the given guide number and distance. During movement of the change over member, the following occurs:

During the initial movement of the change over member 26 in the clockwise direction, the latching lever 30 is first moved in the counter clockwise direction by the control cam 26c and its nose 30b' is pivoted into the latching opening 18b of the carrier arm 18a. As a result the time cam ring is held locked in its limit position which may be a setting of 1/30 second. During the ensuing movement of the change over member 26 its setting nose 26b engages the arm 24c of the diaphragm ring 24 and carries it along in the same direction and this in turn moves the diaphragm control ring 22 through the pin-slot connection 22a, 24a. The required diaphragm aperture can be adjusted with reference to the diaphragm scale 26a' on the change over member 26 and the market 28. During this manual setting the spring 34 is loaded to a greater or lesser extent and the positive engagement between the active surface 24c of the transmission ring 24 and the anchor pin 18c of the time cam ring 18 is broken. A detent device (not shown) holds the manual setter in the specific setting position (in each position given by the diaphragm scale values or in A-position).

When the change over member 26 is returned back from a manually-operated diaphragm setting to a programme system, the change over member 26 is re-set to "A" and the positive engagement between the active surface 24e and the anchor pin 18c of the two rings 24 and 18 is reestablished by the coupling spring 34. Finally the latching lever 30 returns to its FIGURE 1 position under the compulsion of its spring 32 and again releases the time cam ring from its locked condition.

In accordance with the present invention, the active surface 24e of the ring 24, which is in engagement with the anchor pin 18c, is so disposed that it extends at right angles to the direction in which the coupling spring 34 exerts its effort. As a consequence no detrimental lateral force components, generated by the coupling spring 34, are applied in the positive engagement between the parts 18c and 24e.

This has the advantage that the coupling spring is incapable of producing any relative movement between the two setting rings or causing any lateral pressure to be applied by the setting rings to their guide paths, so that the rotary movements of the two coupled setting members are performed without any detrimental bias by the coupling spring and with a minimum amount of setting force being required.

This is particularly important in the case of automatic exposure-regulating devices controlled by an exposure meter, in which easy action of the setting rings is an essential pre-requisite.

A further advantage is to be seen in the fact that the system of coupling the two setting rings in accordance with this invention is acquired with a simple and compact structure with a minimum requirement of parts.

Obviously many modifications and variations of the present invention are possible in light of the above teachings. What is claimed as new and is desired to be secured by Letters Patent is:

1. In a photographic shutter, a time setting ring, an anchoring pin mounted on said time setting ring, a diaphragm setting ring, an arm on said diaphragm setting ring engageable with said anchoring pin, both of said rings being rotatable about the optical axis of the shutter, a coupling spring interconnecting said rings and maintaining the anchoring pin and arm in engagement, the longitudinal axis of the coupling spring extending perpendicular with respect to the engaging face of said arm, a pivoted latch engageable with said time setting ring, spring means on said latch normally urging said latch to a disengaged position with respect to the time setting ring, a manually operable rotatable member, cam means on said member for engaging said latch and urging the latch to an engaged position with respect to the time setting ring, a shoulder on said member for engaging said diaphragm ring and shifting said ring to a selected position while retaining said time setting ring in a predetermined locked position.

2. In a photographic shutter, a time setting ring, a diaphragm setting ring, said time setting ring being disposed forwardly of said diaphragm setting ring, both of said rings being mounted for rotation about the optical axis of the shutter, a rearwardly extending carrier arm on said time setting ring, an anchoring pin mounted on said carrier arm, a laterally extending coupling arm on said diaphragm setting ring, an engaging face on said coupling arm, said engaging face of the coupling arm and said anchoring pin adapted to be brought into engagement with each other, means comprising a coupling spring secured to said anchoring pin and to said diaphragm ring to maintain said engaging face and pin in engagement, the longitudinal axis of said spring extending perpendicular with respect to the engaging face of said coupling arm.

References Cited by the Examiner
UNITED STATES PATENTS
2,891,457   6/1959   Schwahn _____ 95—64

JOHN M. HORAN, *Primary Examiner.*